United States Patent Office 3,294,686
Patented Dec. 27, 1966

3,294,686
PIGMENT PARTICLES COATED WITH
ORGANO-ALUMINUM COMPOUNDS
Joseph W. Ayers, 22 N. 14th St., Easton, Pa. 18042
No Drawing. Filed Nov. 16, 1964, Ser. No. 411,633
8 Claims. (Cl. 252—62.5)

This application is a continuation-in-part of application Serial No. 143,050 filed October 5, 1961, now abandoned.

This invention relates to improved pigment compositions, and to methods of making the same. In particular, this invention relates to coated pigment compositions and to methods for making the same.

Pigments, as herein referred to, are extremely finely divided solids ordinarily insoluble in their environment. They have many varied uses, e.g., as components in decorative and protective coatings, in elastomeric, plastic, and mastic compositions, in printing inks, and in rigid bodies such as masonry, refractories, ceramics, etc.

In such compositions pigments are used for imparting chroma, hue, value, obscurity and desirable physical, mechanical, electrical, and magnetic properties to the composition. In many cases, the use and effects of the presence of a pigment in such compositions are enhanced if the pigment is made as compatible as possible with the other components of the compositions into which it is incorporated. For example, a compatible pigment having little resistance to incorporation in a composition in which it is used will disperse quickly in the composition with little effort. Also, if a pigment is treated to repel water, it can aid in waterproofing a composition in which it is a part. If such a composition is otherwise water sensitive, the inclusion of a hydrophobic pigment therein aids in the stabilization of the composition against the effect of water.

An object of the present invention is the treatment of pigments with modifying agents to improve the utility of the pigments in coating compositions. Another object of the invention is the preparation of coated pigment particles which disperse more readily in compositions into which they are incorporated, and which can be employed in a higher pigment to binder ratio than heretofore possible. Still another object of the present invention is the treatment of pigment particles to form a coating thereon of substances which render the pigment particles more compatible with a variety of media in which the particles may be dispersed.

By rendering a pigment more readily dispersible in a composition in which it is a component, the amount of mechanical energy necessary to disperse the pigment in the system is reduced. In consequence, the amount of time required to obtain a desired degree of dispersion of the pigment is shortened, with a corresponding reduction in energy costs. Ease of dispersion permits the use of higher ratios of pigment to binder in a system. By increasing the ratio of pigment to binder within a composition, the desirable properties lent by the pigment to the composition can be accentuated. Thus, the obscuring capacity of a pigment composition containing a pigment can be increased by increasing the pigment to binder ratio in the composition. In the case of magnetizable pigments, increasing the pigment to binder ratio can increase the magnetic remanence of the composition. Normally hydrophilic pigments which are converted to hydrophobic pigments by the methods of the invention are especially useful in compositions sensitive to water, such as lithographic inks which normally emulsify when contaminated with but traces of water. Such treatment also improves the rate of flow and reduces the degree of penetration of highly pigmented coating compositions, such as magnetizable lithographic inks.

A particularly advantageous feature of the present invention is the ability to treat pigments with a variety of materials of differing degrees of hydrophobicity or hydrophilicity in order to best adapt the pigment for maximum compatibility with the medium in which it is to be dispersed.

Pigments to which the present invention is applicable include, but are not limited to: carbon pigments; inorganic chemical colors such as chrome yellows, Prussian blue, chrome greens, ultramarine blues, zinc and lead chromates, pure and litho cadmium reds and yellows; organic colors, for example, paratoluidine, lithol, and indanthrene reds and maroons, benzidene and hansa yellows, phthalocyanine greens and blues; the inorganic oxide and hydroxide colors such as the iron oxide reds, maroons, yellow, browns, and blacks, and the oxides and hydroxides of chrome, nickel, copper, manganese, cobalt, etc. Also those pigments known as the opaque whites, such as titanium dioxide, lithopone, zinc oxide, lead carbonate, lead sulfate, antimony oxides, etc., and the extender pigments as, for example, blanc fixe, barium sulfate, natural and artificial calcium carbonate, clay, mica, silica, alumina, magnesium and calcium silicates natural and artificial, etc., are exemplary of pigments which can be treated according to the invention.

The pigment treating agents of the invention include aluminum triacylates of the formula AlXYZ, where X, Y, and Z are acylate radicals of the same or different carboxylic acids. The acids, or acylate radicals, may be saturated or unsaturated, branched or unbranched, and are preferably fatty acids having at least 12 carbon atoms, preferably 12–20 or more carbon atoms.

Aluminum triacylates of this type are taught in U.S. 2,835,685 granted May 20, 1958, and include those in which the acylate radicals are, for example, laurate, myristate, palmitate, stearate, oleate, linoleate, sorbate, linolenate, etc., such as aluminum tri-(oleate-linoleate) (which term is employed to designate a triacylate in which the three radicals are oleate or linoleate radicals in all possible combinations of three), aluminum tristearate, and the like. These aluminum triacylates are generally prepared by reaction of organo-aluminum compounds, suitably aluminum alkoxides such as aluminum isopropoxide, with fatty acids as described in the aforementioned patent, and some are available commercially. However, it must be emphasized that the treating agents of the invention are true triacylates, and are to be distinguished from some commercial "tri-soaps" which are merely mixtures of fatty acids with hydroxy di-soaps.

A preferred class of pigment treating agents according to the present invention includes materials prepared by the method described and claimed in U.S. Patent 2,979,497 granted April 11, 1961. The method, which involves the reaction of carboxylic acids and water with aluminum alkoxides in an approximately 1:1:1 molar ratio, is taught by the patent to produce oxy aluminum acylate polymers, particularly cyclic trimers. Materials prepared from monocarboxylic acids, saturated or unsaturated, branched or unbranched, having 8–20 or more carbon atoms are of particular utility in the present invention.

However, the pigment treating agents having the widest diversity of properties and the most flexible range of uses are oxy aluminum compounds prepared by the methods of U.S. 2,979,497 but in which fatty acid groups are replaced by groups of a different polar nature. The resulting pigment treating agents have wetting properties differing from those of the materials containing only fatty acid groups. By variation of the number and nature of the different polar acid groups present in the treating agents, a spectrum of materials is obtained, which materials are adaptable to the treatment of pigments to improve their wetting by a wide variety of different dispersing media.

As groups suitable for replacing the fatty acid radicals, the phosphates, sulfonates, amines, and amides of aliphatic and araliphatic compounds, including hydrocarbons and substituted hydrocarbons, can be mentioned. The chain length of the materials may vary widely from short chains of as few as 2 carbon atoms to araliphatic structures having an aromatic nucleus, such as a benzene nucleus, and aliphatic radicals having up to 20 or more carbon atoms substituted thereinto.

These groups replacing fatty acid radicals include materials as widely divergent as ethyl sulfonate, having only 2 carbon atoms, and dodecyl benzene sulfonate, having 18 carbon atoms, as well as materials of intermediate chain length and hydrophobicity such as fatty acid amides and phosphates. Materials containing additional polar groups such as hydroxy groups can be introduced into the aluminum pigment treating agents, as when ethanolamine is employed to replace a fatty acid radical.

The preparation of these latter materials containing one or more groups other than carboxylic acid groups is the same as that taught in the afore-mentioned U.S. Patent 2,979,497, except that all or a portion of the acid reagents disclosed in the patent are replaced by a sulfonate, phosphate, amide, or amine as described.

A preferred method of coating pigment particles comprises contacting the pigment with a solution of the aluminum treating agent dissolved in an organic solvent. Suitably, the solvent is inert, i.e. nonreactive with either the pigment or treating agent, but otherwise the nature of the organic solvent is not critical to the invention, since it functions merely as a vehicle for effecting the contact of pigment and treating agent. Preferably, the solvent is a material which is easily removable by evaporation at room temperature or below, or by heating at temperatures above room temperature, or which can be removed under reduced pressure. Numerous aliphatic, aromatic, and cycloaliphatic solvents and solvent mixtures such as hexane, heptane, cyclohexane, dioxane, benzene, toluene, naphtha, etc., are suitable, for example.

If the distribution of the treating agent over the surface of the pigment particles is not complete after removal of the volatile solvent, the distribution of the pigment may be enhanced by mechanical means. Mechanical agitation of the coated pigment in any one of numerous mechanical devices is effective in aiding the distribution of the treating agent over the surface of the particles. Devices such as chasers, ball mills, rod mills, sand grinders, hammer mills, disintegrators, entolators, impact roller mills, internal mixing devices such as dough, Baker-Perkins, and Banbury mixers, and also fluid energy and vibrating mills can be suitably employed.

Pigments may also be coated with the treating agents of the invention directly at ambient or elevated temperatures with or without the aid of mechanical agitation, or also by addition of the treating agent to suspensions or pulps of a pigment in a suitable solvent to form pastes.

The aluminum treating agents are suitably applied to pigment particles in amounts sufficient to saturate completely the adsorptive and absorptive capacity of the pigment particles surface, and to coat the particles with a layer of treating agent. It is desirable that the amount of treating agent be kept at a minimum for economic and other reasons. Normally, the amount by weight of treating agent used varied between 0.25 and about 6 percent by weight of pigments, but amounts as low as 0.1 percent by weight of pigment are suitable in high density pigments having low oil absorption and low specific surface area.

These methods of treating pigments to produce a coating on the individual particles of the pigment, thus directly altering the character of the pigment surface prior to dispersion of the pigment in a vehicle, must be distinguished from a mere mutual dispersion of pigment and another material in a common carrier medium. Thus, certain of the pigment treating agents used in this invention have heretofore been added as drying oils to materials such as paints containing dispersed pigments. Such processes do not result in a coating of the pigment with the treating agent as contemplated herein.

The amount of treating agent employed with a specific pigment will vary from case to case depending on the physical properties of the pigment and, to a more limited extent, on its chemical composition and chemical reactivity, if any, with the treating agent. For example, the specific area, specific gravity, surface energy, surface polarity, and chemical reactivity of the pigment particles influence the amount of treating agent needed to render a pigment particles compatible with a given vehicle.

A simple test for the effectiveness of a hydrophobic coating on a pigment can be easily carried out by adding 50 grams of the coated pigment to 500 ml. of water in a "Waring" type blender and agitating for one minute. The agitated mixture is then transferred to a 600 ml. glass beaker, and the contents of the beaker are observed after standing for 30 minutes. A suitably hydrophobic pigment will remain at the surface of the water, with none of the pigment particles settling to the bottom of the beaker. On the other hand, hydrophilic pigments will settle completely to the bottom of the beaker in a very short period of time.

The aluminum treating agents of the invention can be hydrolyzed, and the pigment coatings of the invention may include stable hydrolysis products of the treating agents. These hydrolysis products are complex, but are believed to comprise stable, linear, water-insoluble aluminum oxy-acylate polymers, hydroxy diacylates, and, possibly, higher hydrolysis products. Pigments, because of their large, active, surface area, usually have considerable amounts of moisture adsorbed thereon. The treating agents of the invention thus can hydrolyze at the particle surface with replacement of all or part of this adsorbed moisture by hydrolysis products, greatly increasing the effectiveness of the pigment treatment as compared with treatments attempting direct application of hydrolysis products to the particle surface. Hydrolysis of the treating agent on the pigment surface can also occur on contact of the coated pigment with atmospheric moisture or on combination of the pigment into compositions containing aqueous components.

A better understanding of the invention and of its many advantages will be had by references to the following examples, given by way of illustration.

*Example 1*

35 pounds of precipitated synthetic ferroso-ferric oxide having an average diameter of less than 1 micron, and a solution containing 19½ ounces of aluminum tri-(oleate-linoleate) dissolved in 19½ ounces of No. 6 naphtha were added to an 18″ diameter ball mill charged to 40 percent of its volume with grinding media, e.g., natural pebbles, artificial refractory pebbles, or metal balls, preferably from ½″ to 1″ in diameter. The ball mill was rotated for from 10–60 minutes, and the solvent then removed by evaporation. The coating time usually varies for from 10–60 minutes depending upon the particle size, surface area, degree of agitation, surface energy and particle size distribution of the pigment particles treated. Longer contact times can be employed without harm, but are uneconomical.

*Example 2*

6 pounds of gamma ferric oxide were charged into a laboratory chaser. While the chaser was running, 191 gms. of aluminum tri-(oleate-linoleate) dissolved in 173 gms. of No. 6 naphtha were slowly added. Chasing was continued for 30 minutes, and the solvent was then removed by evaporation.

A comparison of the treated and untreated pigment is given below:

|  | Untreated | Treated |
|---|---|---|
| Apparent density | 6.492 gms./cu. in. | 10.373 gms./cu. in. |
| Tap density | 36 cc. | 48 cc. |
| Oil absorption | 35.26 percent by weight of pigment. | 26.00 percent by weight of pigment. |

Advantageous properties other than hydrophobicity of the gamma ferric oxide treated as in Example 2 are evident from the comparative data above. The increase in apparent density, tap density, and reduction in oil absorption are substantial.

*Example 3*

700 gms. of titanium dioxide and 14 gms. of aluminum tri-(oleate linoleate) dissolved in 50 gms. of high flash naphtha were intimately blended in a ribbon blender. After removal of the solvent by evaporation, the blended mass was passed through a "Raymond" laboratory high-speed disintegrator three times, after which the titanium dioxide was found to be well coated and hydrophobic.

Treated and untreated titanium dioxide pigments were separately incorporated into two samples of the following coating composition, which is for a typical white refrigerator baking enamel and comprises pigments, resin binders, and solvents volatilized during baking:

| | Parts by weight |
|---|---|
| Titanium dioxide | 300 |
| "Duraplex N.D. 77B," a coconut fatty acid alkyd | 155 |
| "Dyal XAC-O," a castor oil alkyd | 189 |
| "Uformite M-311," a triazine resin | 269 |
| Butyl acetate | 36 |
| Butyl alcohol | 73 |
| Butyl "Cellosolve" | 15 |

After passing the above composition twice through a three-roller laboratory mill, the following properties were determined:

|  | Composition Containing Treated Pigment | Composition Containing Untreated Pigment |
|---|---|---|
| Grinding Ratio (paste paddle load 700 gms.), percent | 65%/35% | 57.5%/42.5% |
| Viscosity of the grinding paste (time in seconds) | 20 | 35 |
| Hegman Fineness | 6.5 | 6 |

From the above table it can be seen that the pigment-to-vehicle grinding ratio is higher, the viscosity is lower, and the Hegman fineness is higher for the composition containing treated pigment.

The enamel compositions were applied to steel panels and baked for 15 minutes at 325° F. Other panels were baked for one hour at 350° F. Gloss measurements were made at a 60° angle on the resulting panel finishes.

|  | Gloss of Finish Containing Treated Pigment | Gloss of Finish Containing Untreated Pigment |
|---|---|---|
| Baked for 15 minutes at 325° F. | 100 | 94 |
| Baked for 1 hour at 350° F. | 87 | 82 |

Pigments coated with aluminum acylates can be employed with success in a wide variety of coating compositions other than baking enamels, and the specific enamel constituents shown here are not critical to the use of coated pigments in such coating compositions.

*Example 4*

A white refrigerator baking enamel similar to that in Example 3 was prepared from a titanium dioxide pigment employing aluminum tristearate as the coating agent. The proportions and procedures were otherwise like those in Example 3.

After passing the titanium dioxide composition through a laboratory roller mill, the following properties were determined:

| | |
|---|---|
| Grinding ratio, percent | 64/36 |
| Viscosity of the grinding paste | 25 |
| Hegman fineness | 7 |

After applying the above composition to steel panels and baking as in Example 3, gloss measurements were also made as in Example 3.

| | Gloss |
|---|---|
| Baked for 15 min. at 325° F. | 105 |
| Baked for 1 hour at 350° F. | 96 |

*Example 5*

The hydrophobic ferroso-ferric and gamma ferric oxide pigments of Examples 1 and 2 can be used in the preparation of lithographic inks. A typical lithographic ink formulation containing pigment, surface active agents, and ink oils is:

| | Parts by weight |
|---|---|
| Treated magnetic iron oxide | 67 |
| Soyabean lecithin | 2 |
| Oxidized linseed dispersing oil | 3 |
| Medium-kettle-bodied lithographic ink oil | 28 |

The treated pigment is dispersed in the remaining ingredients in a vibrating or attrition type mill, preferably at elevated temperatures not exceeding 125° F. The magnetic properties of the ink pigments, after saturation in a field of 1,000 oersteds are:

| | |
|---|---|
| Coercive force ($H_c$), oersteds | 250–350 |
| Remnant magnetization ($B_r$), gauss | 600–900 |

Coated magnetic pigments can be used in numerous other magnetic ink compositions, and the ingredients specifically shown above are not critical to the good effects obtained from use of a coated pigment in the composition.

*Example 6*

A number of oxy aluminum materials was prepared as in U.S. 2,979,497 except that all or a portion of the carboxylic acid reactant of the patent was replaced by other groups.

In this and the following examples, an aluminum alkoxide was dissolved in a suitable anhydrous solvent at about 110° C. A second solution containing, per molar part of alkoxide, about one molar part of water and one molar part of carboxylic acid and/or other reagent as described was slowly added to the first solution with distillative removal of alcohol liberated from the alkoxide. The temperature was gradually raised to 140°–150° C. during addition, and after addition was raised to 160°–170° C. After distillation at normal pressure diminished, a vacuum was applied.

A di-stearate mono-ethylhexyl phosphate oxy aluminum treating agent was prepared in the manner described from 204 gms. of aluminum isopropoxide dissolved in 200 gms. of xylene, and from 184 gms. of stearic acid, 108 gms. of ethylhexyl phosphate, and 16 gms. of water in 94 ml. of toluene and 180 ml. of isopropanol. The product was a low viscosity liquid.

*Example 7*

A mono-stearate di-ethylhexyl phosphate oxy aluminum treating agent was prepared as in Example 6, except using 93 gms. of stearic acid and 216 gms. of ethylhexyl phosphate.

*Example 8*

Oxy aluminum di-stearate mono-stearic acid amide was prepared as in Example 6 from a solution of 204 gms. of aluminum isopropoxide in 200 gms. of xylene, and 184 gms. of stearic acid, 94 gms. of stearic acid amide, and 16 gms. of water in 100 ml. of toluene and 200 ml. of isopropanol. Because of the very viscous nature of the product at 160° C., a further 40 gms. of xylene were added.

Example 9

A di-stearate mono-ethane sulfonate oxy-aluminum pigment treating agent was prepared as in Example 6 from 204 gms. of aluminum isopropoxide in 300 gms. xylene, and 184 gms. stearic acid, 38 gms. of ethane sulfonic acid and 14 gms. of water in 100 gms. toluene and 140 gms. of isopropanol. The product was a solid which was dissolved in an equal weight of toluene.

Example 10

Oxy aluminum dodecyl benzene sulfonate was prepared by dissolving 28 lbs. of aluminum isopropoxide in 10 lbs. of xylene at 80° C. While the temperature was raised to 150° C., a mixture of 45 lbs. of dodecyl benzene sulfonic acid in 15 lbs. of isopropanol was added, and isopropanol was distilled off. After the isopropanol had been removed, 15 lbs. of xylene were added and the batch was cooled to 100° C. A mixture of 1.5 lbs. of water and 10 lbs. of isopropanol was added and the temperature was raised to 150°–160° C. until no more solvent distilled off. Vacuum was then applied for further distillation. After distillation, 20 lbs. of toluene were added. The resultant yield was 74% (66% solids).

Mixed stearate dodecyl benzene sulfonate aluminum oxide treating agents are prepared in similar fashion by use of mixtures of stearic and sulfonic acids.

Example 11

An oxy aluminum isopropoxide was first prepared by reacting aluminum isopropoxide with water in a 1:3 molar ratio.

To 112 gms. of the product in 50 gms. toluene at 110° C. were added 187 gms. of stearic acid. The temperature was raised to 130° C. to remove isopropanol, and the batch was then cooled to 100° C. Next, 2.3 gms. of ethanolamine were added, with heating to 130° C. to complete the reaction forming oxy aluminum di-stearate mono-ethanolaminate.

Example 12

Oxy aluminum stearate di-ethanolaminate was prepared by the procedure of Example 11, starting with the same amount of oxy aluminum isopropoxide but employing 93 gms. of stearic acid and 40.7 gms. of ethanolamine.

Example 13

Samples of a titanium dioxide (anatase) pigment having a medium oil absorption of 25 percent and a Reynolds tinting strength of 1250 ("Titanox AMO") were ball milled with different oxy aluminum treating agents, as shown below in Table I, for 30 minutes. The pigments were then passed three times through a "Raymond" impact mill (1/64" screen) and were formed into pastes by addition of naphtha as shown in Table I. (The numerical entries in the table are parts by weight.)

TABLE I

| Ingredient | Sample No. | | | | | |
|---|---|---|---|---|---|---|
| | 1 | 2 | 3 | 4 | 5 | 6 |
| $TiO_2$ | 700 | 700 | 700 | 700 | 700 | 700 |
| Oxy aluminum stearate (50%, in mineral spirits) | 18.75 | 14.0 | | | | |
| Oxy aluminum di-stearate monododecyl benzene sulfonate | | | 18.75 | 14.0 | | |
| Oxy aluminum dodecyl benzene sulfonate (33% in toluene) | | | | | 28.4 | |
| Oxy aluminum octoate (50%, in hexane) | | | | | | 18.75 |
| No. 6 naphtha (initial B.P., 200° F.; F.P. 55° F.) | 31.25 | | 31.25 | | | |
| High flash naphtha, (initial B.P., 364° F.; F.P. 142° F.) | | 36.0 | | 36.0 | 46.6 | 56.25 |

Samples 1–4, in which the pigment appeared to the eye to be best dispersed, were further dispersed in a binder vehicle in the proportions shown in Table II. For purposes of comparison, a dispersion of untreated $TiO_2$ was also prepared, but approximately 10 percent more binder was required because of the lower wettability of the untreated pigment.

In each case, the pigment and binder were passed twice through a paint roller mill, and were then further reduced to a 20 percent pigment concentration by addition of further binder.

The binder was a naphtha solution containing 50 percent of solids. The solids comprised a pure drying alkyd resin of 42 percent phthalic anhydride and 41 percent soya oils. The binder is commercially available under the mark "Beckosol 1307-50."

TABLE II

| Ingredient | Control | Sample No. | | | |
|---|---|---|---|---|---|
| | | 1 | 2 | 3 | 4 |
| $TiO_2$ | 60 | | | | |
| $TiO_2$ + 2% oxy aluminum stearate | | 60 | | | |
| $TiO_2$ + 1% oxy aluminum stearate | | | 60 | | |
| $TiO_2$ + 2% oxy aluminum distearate monododecyl benzene sulfonate | | | | 60 | |
| $TiO_2$ + 1% oxy aluminum distearate monododecyl benzene sulfonate | | | | | 60 |
| Binder | 44.5 | 40 | 40 | 40 | 40 |

Samples 1–4 of Table II were thinned by addition of 35 gms. of xylene. To bring the control to the same viscosity, for spray application, 40 gms. of xylene were required. The thinned control and samples were sprayed on phosphate treated steel panels and baked to hardness at 300° F.

The Hegman fineness, gloss (60°), and reflectance were measured for each panel and are reported in Table III below.

TABLE III

| | Control | Sample No. | | | |
|---|---|---|---|---|---|
| | | 1 | 2 | 3 | 4 |
| Hegman fineness | 6.0 | 7.0+ | 7.0+ | 7.0+ | 7.0+ |
| Gloss (60°) | 98.0 | 103 | 98.0 | 106.0 | 104.0 |
| Reflectance | 86.0 | 87.0 | 86.6 | 87.0 | 86.5 |

Example 14

Proceeding as in Example 13, a "Titanox AMO" titanium dioxide pigment was coated with oxy aluminum stearate at a concentration of 0.5 and 1 percent by weight of the pigment (Samples No. 7 and 8 respectively), with 0.5 and 1 percent of oxy aluminum di-stearate mono-ethylhexyl phosphate (Samples No. 9 and 10 respectively), and with 1 percent of oxy aluminum di-stearate mono-stearic acid amide (Sample No. 11).

Each sample was dispersed on a paint roller mill in the alkyl binder of Example 13 in the proportions shown in that Example. A control prepared from untreated $TiO_2$ was also made up in which about 10 percent more binder was required for dispersion than was employed for the treated pigments. All samples were again reduced to 20 percent solids by addition of more vehicle, and then thinned with xylene in the amounts reported in Example 13. Spray coated panels were tested for gloss (60°) as shown in Table IV.

TABLE IV

| | Control | Sample No. | | | | |
|---|---|---|---|---|---|---|
| | | 7 | 8 | 9 | 10 | 11 |
| Gloss, 60° | 89 | 103 | 95 | 101 | 104 | 99 |

Example 15

The relative hydrophobicity of typical oxy aluminum acylates and modified oxy aluminum acylates was tested by agitating treated pigments in a fixed volume of water with a Waring Blendor and observing the degree of settling after a fixed elapsed time.

A control of untreated "Titanox AMO" titanium dioxide and samples of the same pigment treated with 0.5 and 0.75 percent of oxy aluminum di-ethylhexyl phosphate mono-stearate (Samples 12 and 13), 0.75 and 1.0 percent of oxy aluminum di-stearate mono-ethanolaminate (Samples 14 and 15), and 1.0 percent of oxy aluminum di-stearate mono-stearic acid amide (Sample 16) are compared in Table V.

TABLE V

| | |
|---|---|
| Control | Complete settling of pigment. |
| Sample No.: | Degree of Dispersion |
| 12 | Fair, dispersion cloudy. |
| 13 | Good, dispersion slightly cloudy. |
| 14 | Fair, dispersion cloudy. |
| 15 | Excellent, no settling. |
| 16 | Excellent, no settling. |

As is evident from Table V, the greater degree of hydrophobicity of samples such as Nos. 14 and 15 indicates the suitability of the treating agents of these samples for use in coating pigments to be dispersed in non-aqueous or other non-polar media. The greater hydrophilicity of Samples 12 or 14 indicates the greater suitability of pigments treated with these agents for dispersion in aqueous or other polar or water-like media. Pigments treated with oxy aluminum acylates modified to contain one or more phosphate radicals are particularly suitable in water-base paint compositions, for instance.

Although specific embodiments have been shown and described herein, it is to be understood that they are illustrative and are not to be construed as limiting on the scope and spirit of the invention.

What is claimed is:

1. Finely divided pigment particles coated with a pigment treating agent selected from the group consisting of (1) aluminum triacylates in which the acylate radicals are those of a monocarboxylic acid having at least 12 carbon atoms and (2) modified trimeric oxy aluminum acylates in which the acylate radicals are those of a monocarboxylic acid having at least 8 carbon atoms and wherein at least one of said acylate radicals is replaced by a radical of an aliphtic or araliphatic phosphate, sulfonate, amine, or amide having at least two carbon atoms.

2. Pigment particles as in claim 1 coated with an aluminum triacylate.

3. Pigment particles as in claim 2 wherein said aluminum triacylate is aluminum tristearate.

4. Pigment particles as in claim 2 wherein said aluminum triacylate is aluminum tri-(oleate-linoleate).

5. Pigment particles as in claim 1 coated with a modified trimeric oxy aluminum acylate.

6. Pigment particles as in claim 5 wherein said modified trimeric oxy aluminum acylate is trimeric oxy aluminum dodecyl benzene sulfonate.

7. Coated pigment particles as in claim 1 wherein said pigment is a magnetic pigment.

8. Coated pigment particles as in claim 1 wherein said pigment is titanium dioxide.

References Cited by the Examiner
UNITED STATES PATENTS

| | | | |
|---|---|---|---|
| 2,289,316 | 7/1942 | Meyers | 106—308 |
| 2,688,649 | 9/1954 | Bjorksten | 252—62.5 |
| 2,801,190 | 7/1957 | Orthner et al. | 260—414 |
| 2,835,685 | 5/1958 | Rinse | 260—448 |
| 2,913,468 | 11/1959 | Rinse | 260—448 |
| 2,917,400 | 12/1959 | Edwards | 106—308 |
| 2,979,497 | 4/1961 | Rinse | 260—448 |
| 3,052,644 | 9/1962 | Edwards | 106—308 |
| 3,054,751 | 9/1962 | Blake et al. | 106—304 |

HELEN M. McGARTHY, *Primary Examiner.*

TOBIAS E. LEVOW, S. E. MOTT, *Assistant Examiners.*